United States Patent
Wei

(10) Patent No.: US 10,939,391 B2
(45) Date of Patent: **\*Mar. 2, 2021**

(54) ELECTRONIC DEVICE IN WIRELESS COMMUNICATION SYSTEM, AND WIRELESS COMMUNICATION METHOD

(71) Applicant: Sony Corporation, Tokyo (JP)

(72) Inventor: Yuxin Wei, Beijing (CN)

(73) Assignee: SONY CORPORATION, Tokyo (JP)

(\*) Notice: Subject to any disclaimer, the term of this patent is extended or adjusted under 35 U.S.C. 154(b) by 0 days.

This patent is subject to a terminal disclaimer.

(21) Appl. No.: 16/701,161

(22) Filed: Dec. 3, 2019

(65) Prior Publication Data
US 2020/0107280 A1    Apr. 2, 2020

Related U.S. Application Data

(63) Continuation of application No. 16/190,161, filed on Nov. 14, 2018, now Pat. No. 10,524,215, which is a
(Continued)

(30) Foreign Application Priority Data

Dec. 2, 2014    (CN) .......................... 201410721310.2

(51) Int. Cl.
*H04W 24/10*    (2009.01)
*H04W 52/38*    (2009.01)
(Continued)

(52) U.S. Cl.
CPC ......... *H04W 52/383* (2013.01); *H04W 24/10* (2013.01); *H04W 52/18* (2013.01);
(Continued)

(58) Field of Classification Search
CPC ... H04W 52/383; H04W 24/10; H04W 52/18; H04W 52/242; H04W 52/325; H04W 52/365; H04W 52/02; H04W 52/243
(Continued)

(56) References Cited

U.S. PATENT DOCUMENTS 5,491,837 A * 2/1996 Haartsen ............. H04W 52/242
455/62
8,243,664 B2 * 8/2012 Wullich ................ H04W 28/18
370/329
(Continued)

FOREIGN PATENT DOCUMENTS

CN    102792745 A    11/2012
CN    103546970 A     1/2014
(Continued)

OTHER PUBLICATIONS

International Search Report dated Mar. 1, 2016 in PCT/CN2015/095952.

*Primary Examiner* — Hai V Nguyen
(74) *Attorney, Agent, or Firm* — Xsensus LLP

(57) ABSTRACT

An electronic device in a wireless communication system, and a wireless communication method. The electronic device at a user equipment side, performs a device-to-device (D2D) communication with a target user equipment, and the electronic device includes: processing circuitry configured to acquire information on a first power parameter from a base station device, the first power parameter indicates a D2D nominal power for the electronic device to perform D2D communication, the D2D nominal power different from a cellular nominal power for the electronic device to perform a cellular communication with the base station device; and determine, irrelevant to a path loss between the electronic device and the target user equipment, based on the first power parameter, a D2D transmission power for per-
(Continued)

forming the D2D communication between the electronic device and the target user equipment.

18 Claims, 3 Drawing Sheets

Related U.S. Application Data continuation of application No. 15/532,183, filed as application No. PCT/CN2015/095952 on Nov. 30, 2015, now Pat. No. 10,165,528.

(51) Int. Cl.
| | |
|---|---|
| H04W 52/24 | (2009.01) |
| H04W 52/32 | (2009.01) |
| H04W 52/36 | (2009.01) |
| H04W 52/18 | (2009.01) |
| H04W 24/02 | (2009.01) |

(52) U.S. Cl.
CPC ....... *H04W 52/242* (2013.01); *H04W 52/325* (2013.01); *H04W 52/365* (2013.01); *H04W 24/02* (2013.01); *H04W 52/243* (2013.01)

(58) Field of Classification Search
USPC .................................................. 455/522, 69
See application file for complete search history.

(56) References Cited

U.S. PATENT DOCUMENTS

| | | | |
|---|---|---|---|
| 8,942,195 B2* | 1/2015 | Liu | H04W 52/242 |
| | | | 370/329 |
| 9,215,686 B2* | 12/2015 | Kazmi | H04W 52/365 |
| 9,247,508 B2 | 1/2016 | Khoshnevis et al. | |
| 9,414,427 B2 | 8/2016 | Yang et al. | |
| 9,480,026 B2 | 10/2016 | Kwak et al. | |
| 9,516,608 B2* | 12/2016 | Seo | H04W 52/242 |
| 9,554,379 B2* | 1/2017 | Simonsson | H04W 72/082 |
| 9,655,060 B2 | 5/2017 | Kang et al. | |
| 9,661,585 B2 | 5/2017 | Boudreau et al. | |
| 9,693,258 B2* | 6/2017 | Wang | H04W 28/0289 |
| 9,769,840 B2 | 9/2017 | Li et al. | |
| 9,794,950 B2* | 10/2017 | Ryu | H04W 72/085 |
| 9,807,709 B2 | 10/2017 | Deng et al. | |
| 10,165,528 B2* | 12/2018 | Wei | H04W 24/10 |
| 10,361,812 B2* | 7/2019 | Moosavi | H04L 1/0003 |
| 2011/0274092 A1* | 11/2011 | Liu | H04W 52/367 |
| | | | 370/335 |
| 2012/0243431 A1 | 9/2012 | Chen et al. | |
| 2013/0051261 A1* | 2/2013 | Kazmi | H04W 52/0277 |
| | | | 370/252 |
| 2014/0010099 A1 | 1/2014 | Chiu et al. | |
| 2014/0094213 A1 | 4/2014 | Khoshnevis et al. | |
| 2014/0098694 A1* | 4/2014 | Damji | H04W 52/0229 |
| | | | 370/252 |
| 2014/0198694 A1 | 7/2014 | Yang et al. | |
| 2014/0233476 A1* | 8/2014 | Kwak | H04W 72/0413 |
| | | | 370/329 |
| 2014/0376458 A1* | 12/2014 | Ryu | H04W 52/383 |
| | | | 370/329 |
| 2015/0011236 A1* | 1/2015 | Kazmi | G01S 5/0226 |
| | | | 455/456.1 |
| 2015/0017993 A1* | 1/2015 | Ishii | H04W 16/26 |
| | | | 455/444 |
| 2015/0117196 A1* | 4/2015 | Wang | H04L 1/0018 |
| | | | 370/232 |
| 2015/0139196 A1* | 5/2015 | Liu | H04W 72/10 |
| | | | 370/335 |
| 2015/0327189 A1 | 11/2015 | Seo et al. | |
| 2016/0100383 A1* | 4/2016 | Simonsson | H04L 1/20 |
| | | | 455/450 |
| 2016/0150484 A1* | 5/2016 | Seo | H04W 52/322 |
| | | | 455/522 |
| 2016/0205534 A1* | 7/2016 | Fujishiro | H04W 8/005 |
| | | | 455/434 |
| 2016/0302209 A1* | 10/2016 | Behravan | H04L 1/0009 |
| 2017/0006652 A1* | 1/2017 | Lee | H04W 72/08 |
| 2017/0215201 A1* | 7/2017 | Kim | H04L 1/1812 |
| 2017/0324511 A1* | 11/2017 | Moosavi | H04L 1/0046 |
| 2017/0367056 A1* | 12/2017 | Wei | H04W 24/10 |
| 2018/0006771 A1* | 1/2018 | Huss | H04L 5/001 |
| 2018/0014262 A1* | 1/2018 | Lee | H04W 52/30 |
| 2018/0041301 A1* | 2/2018 | Huss | H04L 1/1896 |
| 2018/0092105 A1* | 3/2018 | Lee | H04L 5/0091 |

FOREIGN PATENT DOCUMENTS

| | | |
|---|---|---|
| WO | 2013/133871 A1 | 9/2013 |
| WO | 2014/113424 A1 | 7/2014 |
| WO | 2014/116020 A1 | 7/2014 |
| WO | 2014/126435 A1 | 8/2014 |

* cited by examiner

ELECTRONIC DEVICE IN WIRELESS COMMUNICATION SYSTEM, AND WIRELESS COMMUNICATION METHOD

CROSS-REFERENCE TO RELATED APPLICATIONS

The present application is a continuation of U.S. application Ser. No. 16/190,161, filed Nov. 14, 2018, which is a continuation of U.S. application Ser. No. 15/532,183, filed Jun. 1, 2017 (now U.S. Pat. No. 10,165,528), which is based on PCT filing PCT/CN2015/095952, filed Nov. 30, 2015, which claims priority to CN 201410721310.2, filed Dec. 2, 2014, the entire contents of each are incorporated herein by reference.

TECHNICAL FIELD

The disclosure relates to a technical field of wireless communication, and in particular to an electronic device on a user equipment side and an electronic device on a base station device side in a wireless communication system, and a method for performing wireless communication in the wireless communication system.

BACKGROUND

This section provides background information related to the present disclosure, not necessarily being conventional technology.

Requirements on data transmission rate and transmission efficiency are increased with an explosive growth of the amount of user data, and a load of communication between a user and a base station is increased constantly. D2D (Device-to-Device) communication technology is proposed under the background. The D2D communication technology refers to an information transmission mode in which cellular communication user equipments perform data interaction directly in a terminal-through manner. Compared with the conventional cellular communication, in the D2D communication technology, frequency spectrum resources are multiplexed, the transmission distance is shortened, and the information is not necessarily forwarded via a base station, thereby improving a spectrum use and decreasing a transmission power of a user equipment and a load of the base station. Moreover, the signal has better quality due to the short communication distance, thereby reducing communication interference to other devices.

However, the D2D communication changes a conventional communication mode of user-base-station, some functions of the base station are transferred to the user equipment, hence, it will be a challenge to design a physical layer, an MAC (Media Access Control) layer or a high layer protocol. Particularly, power control in the D2D communication needs to be further regulated and designed.

SUMMARY

This section provides a general summary of the present disclosure rather than a full disclosure of a full scope thereof or full features thereof.

According to a current standardization process, it is agreed that D2D communication is performed in an uplink resource. However, there are the following disadvantages for power control in the D2D communication.

(1) In an uplink power control of PUSCH (physical uplink data channel) according to a current standard, power control is performed only based on a path loss between a terminal and a base station, in order to save frequent signaling interaction. However, terminals perform data interaction directly in a passthrough manner in the D2D communication. In this case, it is inaccurate to control a transmission power of a D2D terminal by considering a path loss between the terminal and the base station without considering a path loss between the terminals.

(2) Interference between a D2D equipment and a cellular network equipment is introduced in a scenario in which intra-cell and inter-cell interference exist in cellular communication due to introduction of D2D communication, thereby making interference condition more complex. In this scenario, the power control only based on the path loss without considering interference may be not enough. Hence, it is necessary to design a power control method for controlling the transmission power of the D2D terminal based on the interference and reducing signaling interaction thereof.

(3) For the D2D terminal and the cellular network terminal allocated to each resource block simultaneously, due to different transmission characteristics thereof, it may result in unsuccessful data decoding in a case where powers of different resource blocks reached to a receiving terminal differ greatly. Interference between different resource blocks is referred to as in-band emission, which should be considered in the power control of the D2D terminal.

(4) The function of PHR (Power Headroom Report) is that, the terminal reports power usage to the base station regularly when assisting the base station to make a decision on the MCS (Modulation and Coding Scheme) and a size of allocated resource block. PHR needs improvement in order to optimize the MCS and resource allocation of D2D due to introduction of D2D. In the cellular network, PHR is triggered jointly once a timer is expired and a change in downlink path loss exceeds a threshold. However, the trigger condition is unsuitable for the D2D communication. Firstly, there is broadcasting in the D2D, and a single-link trigger condition cannot be extended to a broadcasting scenario simply, otherwise much undesired triggering is leaded. Secondly, for D2D unicasting, since the D2D communication is performed in an uplink, it is obviously unreasonable that downlink path loss between the base station and the D2D terminal is used to measure link change condition and thus PHR is triggered. Hence, a PHR process of the D2D terminal is also needed to be designed and regulated to distinguish from a PHR reporting process of the existing cellular network terminal.

It is an object of the present disclosure to provide an electronic device on a user equipment side and an electronic device on a base station device side in a wireless communication system and a method for performing wireless communication in the wireless communication system, a method for performing power control in the D2D communication so as to solve at least one of the above-mentioned technical problems.

In an aspect of the present disclosure, an electronic device on a user equipment side in a wireless communication system is provided, the electronic device performing Device-to-Device (D2D) communication with a target user equipment. The electronic device includes a path loss reporting unit configured to acquire a path loss between the electronic device and the target user equipment, and configured to report information on the path loss to a base station device. The electronic device further includes a power determining unit configured to acquire information on a first power parameter from the base station device, the first power parameter being related to the path loss, and configured to determine, based on the first power parameter, a D2D transmission power for performing the D2D communication between the electronic device and the target user equipment.

In another aspect of the present disclosure, an electronic device on a base station device side in a wireless communication system is provided. The electronic device includes a path loss acquiring unit configured to acquire a path loss from a first user equipment served by the base station device to a second user equipment served by the base station device. The electronic device further includes a power parameter determining unit configured to determine, for the first user equipment, a D2D transmission power parameter for performing Device-to-Device D2D communication with the second user equipment, based on the path loss.

In another aspect of the present disclosure, an electronic device on a user equipment side in a wireless communication system is provided. The electronic device includes a communication quality detecting unit configured to detect Device-to-Device D2D communication quality with a target user equipment. The electronic device further includes a power headroom reporting unit configured to determine, based on the D2D communication quality, whether to trigger a power headroom report to a master user equipment. D2D communication of the electronic device is scheduled by the master user equipment.

In another aspect of the present disclosure, a method for performing wireless communication in a wireless communication system is provided. The method includes acquiring, by a first user equipment, a path loss between the first user equipment and a second user equipment. The first user equipment performs Device-to-Device D2D communication with the second user equipment. The method includes reporting, by the first user equipment, the information on the path loss to a base station device. The method includes acquiring, by the first user equipment, information on a first power parameter from the base station device. The first power parameter is related to the path loss. The method further includes determining, by the first user equipment, a D2D transmission power for performing the D2D communication between the first user equipment and the second user equipment, based on the first power parameter.

In another aspect of the present disclosure, a method for performing wireless communication in a wireless communication system is provided. The method includes acquiring, by a base station device, a path loss from a first user equipment served by the base station device to a second user equipment served by the base station device. The method further include determining, by the base station device, for the first user equipment, a D2D transmission power parameter for performing Device-to-Device D2D communication with the second user equipment, based on the path loss.

In another aspect of the present disclosure, a method for performing wireless communication in a wireless communication system is provided. The method includes detecting, by a first user equipment, Device-to-Device D2D communication quality with a second user equipment. The method further include determining, by the first user equipment, whether to trigger a power headroom report to a master user equipment, based on the D2D communication quality. D2D communication of the first user equipment is scheduled by the master user equipment.

In another aspect of the present disclosure, an electronic device is provided, which includes processing circuitry. The processing circuitry is configured to perform the following operations: acquiring a path loss between the electronic device and the target user equipment, the electronic device performing Device-to-Device (D2D) communication with a target user equipment; reporting information on the path loss to a base station device; acquiring information on a first power parameter from the base station device, the first power parameter being related to the path loss; and determining, based on the first power parameter, a D2D transmission power for performing the D2D communication between the electronic device and the target user equipment.

In another aspect of the present disclosure, an electronic device is provided, which includes processing circuitry. The processing circuitry is configured to perform the following operations: acquiring a path loss from a first user equipment served by the base station device to a second user equipment served by the base station device; and determining, for the first user equipment, a D2D transmission power parameter for performing Device-to-Device D2D communication with the second user equipment, based on the path loss.

In another aspect of the present disclosure, an electronic device is provided, which includes processing circuitry. The processing circuitry is configured to perform the following operations: detecting Device-to-Device D2D communication quality with a target user equipment; and determining, based on the D2D communication quality, whether to trigger a power headroom report to a master user equipment, with D2D communication of the electronic device being scheduled by the master user equipment.

In another aspect of the present disclosure, a machine-readable storage medium is provided, on which a program product according to the present disclosure is carried. The program product includes machine-readable instruction code stored therein. The instruction code, when being read and executed by a computer, causes the computer to perform a method for performing wireless communication in a wireless communication system according to the present disclosure.

With the electronic device on the user equipment side and the electronic device on the terminal side in the wireless communication system, and the method for performing wireless communication in the wireless communication system according to the present disclosure, a transmission power of a D2D terminal can be calculated based on a path loss between the D2D terminals. Compared with the conventional method for performing power control based on a path loss between a base station device and a terminal device, calculation of the transmission power according to the present disclosure is more accurate. Moreover, effects of interference and in-band emission are further considered in the calculation of the transmission power of the D2D terminal according to the present disclosure, and power control includes coarse adjustment and fine adjustment. The coarse adjustment can avoid frequent power control and save signaling overhead, and the fine adjustment can make power control more accurate. At last, in the disclosure, it is further specified interaction of D2D power control signaling and reporting of PHR in different resource allocation modes, which PHR reporting process is more applicable to a D2D communication system. In a word, the disclosure can perform power control of the D2D communication more accurately, thereby improving reliability of data transmission of the D2D communication and enhancing a coexistence with a cellular network.

A further applicable scope will become apparent based on the description provided herein. The description and specific examples in the overview are only for schematic purposes and are not intended to limit the scope of the present disclosure.

BRIEF DESCRIPTION OF THE DRAWINGS

The drawings described herein are only for schematic purposes of the selected embodiments rather than all possible implementation, and are not intended to limit the scope of the present disclosure. In the drawings.

Figure 1:
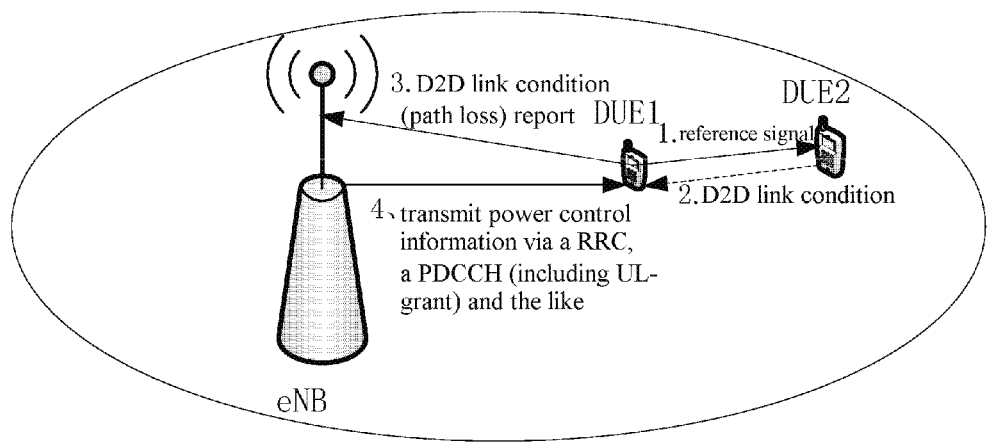
FIG. 1 is a schematic diagram of a scenario in which a D2D transmission power is determined according to an embodiment of the present disclosure.

While the present disclosure is susceptible to various modifications and alternative forms, specific embodiments thereof have been shown by way of example in the drawings and are herein described in detail. It should be understood, however, that the description herein of specific embodiments is not intended to limit the present disclosure to the particular forms disclosed, but on the contrary, the intention of the present disclosure is to cover all modifications, equivalents, and alternatives falling within the spirit and scope of the present disclosure. Note that corresponding reference numerals indicate corresponding parts throughout the several views of the drawings.

DETAILED DESCRIPTION OF THE EMBODIMENTS

Examples of the present disclosure will now be described more fully with reference to the accompanying drawings. The following description is merely exemplary in nature and is not intended to limit the present disclosure, application, or uses.

Example embodiments are provided so that this disclosure will be thorough, and will fully convey the scope to those skilled in the art. Numerous specific details are set forth such as examples of specific components, devices, and methods, to provide a thorough understanding of embodiments of the present disclosure. It will be apparent to those skilled in the art that specific details need not be employed, that example embodiments may be implemented in many different forms and that neither should be construed to limit the scope of the disclosure. In some example embodiments, well-known processes, well-known structures, and well-known technologies are not described in detail.

The present disclosure relates to D2D (Device-to-Device) communication in a wireless communication network. The user equipment involved in the present disclosure includes but is not limited to a terminal having a function of wireless communication such as a mobile terminal, a computer and a vehicle equipment. In addition, the base station device involved in the present disclosure may be an eNodeB or a component in eNodeB such as a chip.

FIG. 1 is a schematic diagram of a scenario in which a D2D transmission power is determined according to an embodiment of the present disclosure.

As shown in FIG. 1, DUE1 and DUE2 are two user equipments for performing Device-to-Device D2D communication, and eNB is a serving base station of the DUEL In a scenario of the D2D communication, communication resources are allocated by the eNB based on a communication state fed back by the DUEL The scenario as shown in FIG. 1 is merely taken as an example, and the present disclosure is not limited thereto. For example, multiple DUEs may exist within a serving range of the eNB, or the eNB may be replaced with a cluster head of a DUE cluster.

According to an embodiment of the present disclosure, the eNB controls a transmission power of D2D communication based on a path loss of a D2D link between the DUE1 and DUE2. For example, a D2D nominal power of the D2D communication is set, and the DUE controls the D2D transmission power based on the nominal power and other adjustment parameter/offset. In an example of the present disclosure, a path loss between two D2D terminals is measured via a reference signal between the D2D terminals. For example, a transmission power of the reference signal is known to both parties of communication. When the DUE1 and the DUE2 need to perform the D2D communication, the DUE1 transmits the reference signal to the DUE2, and the DUE2 measures a receiving power of the reference signal (RSRP). For example, the path loss between the DUE1 and the DUE2 is measured based on a formula of: path loss=the transmission power of the reference signal—the receiving power of the reference signal. In an optional example, the DUE2 generates a quality measurement report of a D2D link from the DUE1 to the DUE2 based on a measured result, and then the DUE1 determines the path loss from the DUE1 to the DUE2 based on a measured result of the DUE2 and transmits information on the path loss to a base station device eNB. In another optional example, the DUE2 transmits the measured path loss together with an unique identifier (such as D2D-RNTI) of the DUE1 transmitting the reference signal to the eNB via a PUCCH directly. The eNB determines power control information based at least on the information on the path loss, and transmits the power control information to the DUEL Then the DUE1 determines a transmission power of D2D transmission between the DUE1 and the DUE2 based at least on the power control information.

In another example of the embodiment, during an initial stage of the D2D communication, all the D2D terminals use a preset maximum transmission power of D2D communication by default, and the DUE1 measures a data signal transmitted by the DUE2 to obtain the path loss. The transmission and a trigger condition of the measurement report may be described as above.

In the above embodiment, the measurement report including the information on the path loss from the DUE may be different from a measurement report of the conventional cellular communication network. Generally, a measured result of the cellular network needs a filtering mechanism of layer 3 to ensure the result not to be affected by shadow fading. It may be considered approximately that an effect of the fading is not concerned since a communication distance between the D2D communication terminals is very short. Hence, in an example of the present disclosure, the DUE does not perform the layer 3 filtering on the measured result of the D2D link. For example, filtering and iteration are not performed on the measured result via a RRC layer, the DUE reports a relatively short-term measured result (for example, a measured result only subjected to layer 1 filtering) to a control terminal such as an eNB. For a reporting trigger condition of the measured result of the D2D link, which is to be reported for each measurement in an example, reporting criteria may be set preferably, for example, a change threshold of the measured result, and the measurement report is transmitted only when a change in the measured result than a last measured result exceeds the threshold.

In addition, in another example, the base station may estimate a path loss between two terminals directly based on the obtained information on a geographical position of the D2D terminal and a signal propagation model, without the path loss being reported by the terminal.

In the present disclosure, a transmission power of the D2D terminal is determined by the D2D terminal by calculating based on the power control parameter provided by a network control terminal such as the above eNB. The power control parameter provided by the eNB includes a D2D nominal power, and at least one of an adjustment parameter based on in-band emission, an adjustment parameter based on a modulation and coding scheme (MCS) and a power adjustment parameter based on a PDCCH. Accordingly, the D2D terminal determines a power for transmitting a signal to other D2D terminal based on the D2D nominal power and in conjunction with at least one of a path loss compensation factor, the adjustment parameter based on in-band emission, the adjustment parameter based on modulation and coding scheme (MCS) and the power adjustment parameter based on PDCCH.

According to an embodiment of the present disclosure, the eNB determines the D2D nominal power based on the path loss of the D2D link obtained in the above manner. For example, the eNB determines the D2D nominal power for a D2D transmitting terminal, such as the DUE1, based on a Signal to Interference plus Noise Ratio SINR demand of a DUE, such as the D2D receiving terminal DUE2 as shown in FIG. 1, the path loss from the DUE1 to the DUE2 and a compensation factor thereof. Specifically, $P_{O\_PUSCH,D}$ represents the D2D nominal power (it is considered in the present disclosure that communication is performed between the DUEs via a PUSCH channel), $T_h$ represents a SINR threshold of the DUE2, $\sigma^2$ represents thermal noise in a communication system, and PL and α represent the D2D path loss and the compensation factor thereof respectively. A specific manner of determining the D2D nominal power is shown as the following equation:

$$P_{0\_PUSCH,D} = \frac{T_h \cdot \sigma^2}{\alpha \cdot PL}$$

Those skilled in the art may determine a specific value of the compensation factor of the D2D path loss based on a definition of a general path loss compensation factor in the 3GPP LTE standard in conjunction with an empiric value, which is not limited in the present disclosure.

In the embodiment, the eNB sets the D2D nominal power accurately and pertinently based on a path loss of a D2D link involved in a specific control object such as the DUE1 and a signal quality requirement of a specific receiving terminal DUE2. In addition, the path loss compensation of D2D is considered in setting the nominal power by the eNB, without notifying the user equipment the path loss compensation factor by the eNB and then performing path loss compensation by the user equipment as in the conventional technology.

In an example, different from a broadcast notifying manner of a nominal power in the conventional cellular communication, the eNB transmits the D2D nominal power to the DUE only via a dedicate signaling such as a RRC signaling, thereby avoiding effect to other user equipment.

In a preferred example, the eNB further determines the D2D nominal power based on an interference condition of a network, and improves the D2D transmission power reasonably based on a network condition, thereby reducing a harmful effect of the interference in the network to the D2D communication. For example, the D2D nominal power is set based on the interference condition of a specific D2D user equipment or an average interference condition in the network. Specifically, for example, the D2D nominal power is determined based on the following equation:

$$P_{O\_PUSCH,D} = \frac{T_h \cdot (\sigma^2 + E[I])}{\alpha \cdot PL}$$

E[I] represents an average interference in the network. It should be noted that, interference is widespread no matter in a network including D2D communication or a network not including D2D communication although interference is not considered in setting the nominal power by the eNB in the existing cellular communication technology. Hence, according to the disclosed content of the present disclosure, the nominal power of a cellular user equipment may also be set based on the interference in the network and thus the nominal power is improved. For example, the eNB sets a nominal power $P_{O\_NOMINAL\_PUSCH,C}$ for an entire coverage area of a cell (Cell specific) based on network interference (for example, $P_{O\_NOMINAL\_PUSCH,C} = T_h \cdot (\sigma^2 + E[I])$, where $T_h$ is a SINR threshold of a general UE), and broadcasts the nominal power via system information SIB2 (UplinkPowerControlCommon: p0-NominalPUSCH) to all the UEs. Specific other content consistent with the conventional technology is not described here, and those skilled in the art may refer to the 3GPP LTE TS36 series standard, for example. As described above, the eNB sets the D2D nominal power for the D2D user equipment via a dedicated signaling such as a RRC signaling in the present disclosure. The setting is semi-static in some examples. In a case where the D2D nominal power is changed as the path loss or interference condition between the D2D user equipments is changed, for example, a preset condition is met for the path loss/interference change degree, the eNB retransmits the RRC signaling to update the D2D nominal power.

The D2D user equipment learns the D2D nominal power thereof via the above-described dedicated signaling, and further determines a transmission power thereof (for example, a transmission power $P_{PUSCH,D}(i)$ for a subframe i) based on the D2D nominal power.

It should be noted that, a maximum transmission power of the D2D user equipment is preset in the present disclosure, for example, $P_{CMAX,D}(i)$. The $P_{PUSCH,D}(i)$ determined based on the parameters such as the D2D nominal power should not be greater than $P_{CMAX,D}(i)$, otherwise $P_{CMAX,D}(i)$ should be used as $P_{PUSCH,D}(i)$. In addition, in some examples, the D2D user equipment keeps up cellular data communication or cellular control communication with the base station while performing D2D communication. For example, the DUE transmits PUSCH and/or PUCCH to the eNB and occupies a part of the maximum transmission power, hence, in this case, $P_{PUSCH,D}(i)$ determined based on the parameters such as the D2D nominal power should not be greater than $P_{CMAX,D}(i)$ minus power shares of a cellular PUSCH and a cellular PUCCH. Next, determination of the D2D transmission power is mainly discussed in a context where the maximum transmission power limit is met.

In an example, the DUE determines the D2D transmission power $P_{PUSCH,D}(i)$ based on a bandwidth (the number of resource blocks) of D2D data communication allocated to the DUE, the D2D nominal power, and an adjustment indicated by TPC (transmission power control) included in the PDCCH. For example:

$$P_{PUSCH,D}(i)=10 \log_{10}(M_{PUSCH,D}(i))+P_{O\_PUSCH,D}+f(i)$$

$M_{PUSCH,D}(i)$ represents the number of the resource blocks allocated to D2D data communication, $P_{O\_PUSCH,D}$ represents the D2D nominal power, and f(i) represents a further adjustment of the transmission power based on the TPC received from the base station under close-loop power control. Here, f(i) may be defined by referring to existing standard in the art such as the 3GPP TS36.213.

In another example, the DUE further determines the D2D transmission power $P_{PUSCH,D}(i)$ based on compensation for MCS. For example:

$$P_{PUSCH,D}(i)=10 \log_{10}(M_{PUSCH,D}(i))+P_{O\_PUSCH,D}+ \Delta_{TF}(i)+f(i)$$

$\Delta_{TF}(i)$ represents compensations for different MCSs, which may be defined by referring to the existing standard in the art such as the 3GPP TS36.213.

In another example of the present disclosure, the base station provides the DUE with a power control parameter related to in-band emission such as $\Delta_{in\_band\_emission}$, and the DUE determines the D2D transmission power $P_{PUSCH,D}(i)$ based on the in-band emission.

The in-band emission represents a condition of interference of the allocated RB (resource block) to unallocated RB. In the communication system of the present disclosure, the base station allocates a resource block for respective D2D user equipment to be used in respective subframe. In a case where unused RBs are allocated to different D2D terminals at the same time, the base station device may calculate a value of in-band emission on the unallocated RB since the base station learns the allocated RB and the unallocated RB. Here, the value of the in-band emission may be calculated based on the well-known technology in the art, which is not limited herein. Subsequently, the base station device sets a value of $\Delta_{in\_band\_emission}$ based on the calculated value of the in-band emission, so that values of the interference on all the RBs to be allocated at the same time are similar. For example, the values of the interference on all the RBs to be allocated at the same time are in the same order of magnitude or equal, thereby avoiding that some signals are submerged by other signals resulted by large difference of the in-band emission on respective RB.

For example, the base station provides a power control parameter related to the in-band emission to the D2D user equipment semi-statically via the RRC signaling. Alternatively, preferably, for example, the base station provides the power control parameter related to the in-band emission to the D2D user equipment via uplink grant information element UL-grant included in the PDCCH to implement dynamic fine adjustment of a transmission power of each D2D transmission. Specifically, for example, a new field is added to UL-grant to represent the power control parameter related to the in-band emission. In an embodiment in which the power control parameter related to in-band emission is transmitted in the UL-grant, in a case where the D2D user equipment transmits PUCCH at the same time, when the base station sets, for the RB allocated to the DUE for D2D communication and near to the PUCCH, $\Delta_{in\_band\_emission}$ be to less than a predetermined threshold, in addition to be in an interference level similar to other RB, so as to reduce interference to the PUCCH.

On a D2D user equipment side, the D2D user equipment determines the D2D transmission power based on the received RRC signaling or PDCCH signaling including the power control parameter related to the in-band emission. For example, it is determined based on the following equation:

$$P_{PUSCH,D}(i)=10 \log_{10}(M_{PUSCH,D}(i))+P_{O\_PUSCH,D}+f(i)+\Delta_{in\_band\_emission}$$

In some examples of the present disclosure, $P_{O\_PUSCH,D}$ is the D2D nominal power determined in the manner as the above example (considering D2D path loss). In other examples of the present disclosure, $P_{O\_PUSCH,D}$ may be a nominal power determined in a manner in the art, and the D2D user equipment may further perform D2D path loss compensation based on the existing nominal power accordingly.

Figure 2:
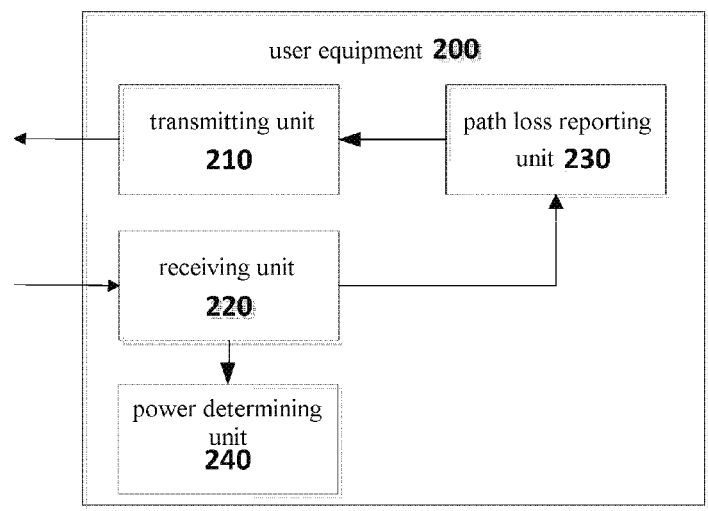
FIG. 2 is a block diagram of a structure of an electronic device on a use equipment side according to an embodiment of the present disclosure.

FIG. 2 is a block diagram of a structure of an electronic device 200 on a user equipment side according to an embodiment of the present disclosure.

In the embodiment, the electronic device 200 may be an electronic device on a user equipment (for example, the DUE1 as shown in FIG. 1) side for performing D2D communication. As shown in FIG. 2, the electronic device 200 may include a transmitting unit 210, a receiving unit 220, a path loss reporting unit 230 and a power determining unit 240. The electronic device 200 may be implemented as a mobile terminal (such as a smart phone, a tablet personal computer (PC), a notebook PC, a portable game terminal, a portable/dongle mobile router and a digital image pick-up apparatus) or a vehicle terminal (such as a car navigation device). The electronic device 200 may further be implemented as a terminal (also referred to as machine-type communication (MTC) terminal) for performing machine-to-machine (M2M) communication. Alternatively, the electronic device 200 may be a wireless communication module (such as an integrated circuitry module including a single wafer) mounted on each terminal of the above terminals.

According to an embodiment of the present disclosure, the electronic device 200 may perform communication with a target user equipment (for example, the DUE2 as shown in FIG. 1). In particular, the path loss reporting unit 230 may acquire a path loss between the electronic device 200 and the target user equipment, and report information on the path loss to a base station device (for example, the eNB as shown in FIG. 1). Here, calculation of the path loss may be performed based on various path loss algorithms well-known in the art, which is not specially limited herein.

Further, the power determining unit 240 may acquire information on a first power parameter from the base station device, the first power parameter being related to the path loss. Moreover, the power determining unit 240 may determine, based on the first power parameter, a D2D transmission power for performing the D2D communication between the electronic device 200 and the target user equipment.

The transmitting unit 210 may transmit data and/or control information to the target user equipment (for example, the DUE2 as shown in FIG. 1) for performing the D2D communication. In an embodiment of the present disclosure, the transmitting unit 210 may transmit a reference signal to the target user equipment.

The receiving unit 220 may receive, from the target user equipment, the data and/or the control information to perform the D2D communication. In an embodiment of the present disclosure, the receiving unit 220 may receive, from the target user equipment, a response signal as a response to the reference signal. In this case, the path loss reporting unit 230 may acquire the path loss between the electronic device 200 and the target user equipment based on the reference signal and the response signal.

In an embodiment of the present disclosure, the path loss reporting unit 230 may transmit the information on the path loss to the base station device via the transmitting unit 210. Further, the receiving unit 220 may receive the information on the first power parameter from the base station device, and provide the information on the first power parameter to the power determining unit 240.

The transmitting unit 210 may further transmit data and/or control information to the base station device (for example, the eNB as shown in FIG. 1) to perform cellular communication according to the cellular communication protocol. For example, the cellular communication protocol here may be LTE-A (Long Term Evolution advanced), LTE-U and the like, which is not specially limited in the disclosure.

The receiving unit 220 may further receive, from the base station device (for example, the eNB as shown in FIG. 1), data and/or control information to perform the cellular communication according to the cellular communication protocol. For example, the cellular communication protocol here may be LTE-A (Long Term Evolution advanced), LTE-U and the like, which is not specially limited in the disclosure.

According to an embodiment of the present disclosure, the first power parameter may indicate a nominal power for the electronic device 200 to perform D2D communication, and the power determining unit 240 may perform power adjustment based on the nominal power to determine the D2D transmission power. Preferably, the power adjustment performed by the power determining unit 240 to determine the D2D transmission power does not include adjustment based on the path loss.

In another embodiment, the first power parameter may further be related to interference in a radio environment where the electronic device 200 is located. For example, the base station device further determines the first power parameter $P_{O\_PUSCH,D}$ based on an average interference of a wireless communication network in which the electronic device 200 and the user equipment are included. Specifically, the base station device determines the first power parameter $P_{O\_PUSCH,D}$ based on the following equation:

$$P_{O\_PUSCH,D} = \frac{T_h \cdot (\sigma^2 + E[I])}{\alpha \cdot PL} \quad (1)$$

$\sigma^2$ represents thermal noise. PL represents the path loss received by the base station device, $\alpha$ is a compensation factor of the path loss, $T_h$ represents a SINR threshold of a receiving terminal (for example, the DUE2 as shown in FIG. 1) of the D2D communication, and E[I] represents an average interference of the wireless communication network in which the electronic device 200 and the user equipment are included.

In an embodiment of the present disclosure, the wireless communication network in which the electronic device 200 and the user equipment are included is modeled and a distribution of a distance between the user terminals in the network is obtained. Here, the wireless communication network may be modeled based on a well-known modeling method in the art. In an embodiment of the present disclosure, it is assumed that a density of the user terminals in the D2D network is $\lambda$, and for a uniform m-dimension Poission Point Process with a density of $\lambda$, a distribution $F_{R_n}(r)$ of a cumulative distribution function cdf of a distance Rn from any user terminal to its n-th neighbor user terminal is:

$$F_{R_n}(r) = 1 - \frac{\Gamma_{ic}(n, \lambda c_m r^m)}{\Gamma(n)} \quad (2)$$

$\Gamma(\ldots)$ represents Gamma Function, $\Gamma_{ic}(\ldots,\ldots)$ represents incomplete Gamma Function, and $c_m r^m$ represents a volume of m-dimension sphere with a radius of r.

The average interference E[I] of the wireless communication network in which the electronic device and the user equipment are included is:

$$E[I] = \sum_{n=1}^{\infty} E[R_n^{-\alpha}] \quad (3)$$

$\alpha$ is a compensation factor of the path loss, $\Sigma$ represents a summation formula, and $E[R_n^{-\alpha}]$ represents seeking an expectation for $R_n^{-\alpha}$.

In an embodiment of the present disclosure, the power determining unit 240 determines, based on the first power parameter $P_{O\_PUSCH,D}$, a D2D transmission power for performing the D2D communication between the electronic device 200 and the user equipment. Specifically, the power determining unit 240 determines the D2D transmission power $P_{PUSCH,D}$ based on the following equation:

$$P_{PUSCH,D} = \min(P_{CMAX,D}(i), 10 \log(M_{PUSCH,D}(i)) + P_{0\_PUSCH,D} + \Delta_{TF}(i) + f(i)) \quad (4)$$

i represents a subframe number, $P_{CMAX,D}(i)$ represents a maximum transmission power of the D2D terminal, for example, 31 dBm, $M_{PUSCH,D}(i)$ represents the number of resource blocks allocated to D2D data communication, $P_{O\_PUSCH,D}$ represents the first power parameter, $\Delta_{TF}(i)$ represents compensations for different MCSs (Modulation and Coding Scheme), and f(i) represents a further adjustment of the transmission power by the TPC (Transmission Power Control) under close-loop power control. Here, $M_{PUSCH,D}(i)$, $\Delta_{TF}(i)$ and f(i) may be defined by referring to existing standard in the art such as the 3GPP TS36.213.

In an embodiment of the present disclosure, in a case where a change in at least one of the path loss and the interference exceeds a threshold, the power determining unit 240 may acquire information on an updated first power parameter from the base station device, and determines the D2D transmission power based on the updated first power parameter. Specifically, in a case where a change in the path loss PL or the average interference E[I] exceeds the threshold, the base station device updates the first power parameter $P_{O\_PUSCH,D}$, the receiving unit 220 receives, from the base station device, information on the updated first power parameter $P_{O\_PUSCH,D}$, and the power determining unit 240 re-determines the D2D transmission power based on the updated first power parameter $P_{O\_PUSCH,D}$. According to the first power parameter $P_{O\_PUSCH,D}$ calculated according to the embodiment of the present disclosure, only when the number of the user terminals in the network is changed significantly, that is, λ is changed, which results in that E[I] is changed, or when the path loss PL between two D2D terminals is changed significantly, the base station device is triggered to transmit the updated first power parameter $P_{O\_PUSCH,D}$ to the electronic device 200. Hence, it is avoided that power control is performed on the electronic device 200 frequently, and signaling overhead is saved, which can be referred to as a coarse adjustment of D2D terminal power control.

In an embodiment of the present disclosure, the electronic device 200 may acquire the information on the first power parameter by parsing a dedicated signaling from the base station device. For example, the receiving unit 220 in the electronic device 200 receives information on the first power parameter via radio resource control RRC signaling.

In another embodiment, the power determining unit 240 may further acquire information on a second power parameter from the base station device, wherein the second power parameter indicates a power adjustment value determined based on in-band emission of a resource block to be allocated to the electronic device 200. Moreover, the power determining unit 240 may further determine the D2D transmission power based on the second power parameter.

Specifically, the receiving unit 220 may further receive, from the base station device, information on the second power parameter. The base station device determines the second power parameter $\Delta_{in\_band\_emission}$ based at least on in-band emission of a resource block to be allocated to the electronic device 200.

In a communication process of D2D, in-band emission represents a condition of interference of the allocated RB (resource block) to unallocated RB. Unused RBs are to be allocated to different D2D terminals at the same time, and the base station device may calculate a value of In-band emission on the unallocated RB since the base station learns the allocated RB and the unallocated RB. Here, the value of the In-band emission may be calculated based on the well-known technology in the art, which is not limited herein. Subsequently, the base station device sets a value of $\Delta_{in\_band\_emission}$ based on the calculated value of the In-band emission, so that values of the interference on all the RBs to be allocated at the same time are similar. For example, the values of the interference on all the RBs to be allocated at the same time are in the same order of magnitude or equal.

In an embodiment of the present disclosure, the power determining unit 240 further determines the D2D transmission power for performing D2D communication between the electronic device 200 and the user equipment based on the second power parameter $\Delta_{in\_band\_emission}$. Specifically, the power determining unit 240 determines the D2D transmission power $P_{PUSCH,D}$ based on the following equation:

$$P_{PUSCH,D}=\min(P_{CMAX,D}(i),10\ \log(M_{PUSCH,D}(i))+P_{0\_PUSCH,D}+\Delta_{TF}(i)+f(i)+\Delta_{in\_band\_emission}) \quad (5)$$

i represents a subframe number, $P_{CMAX,D}(i)$ represents a maximum transmission power of the D2D terminal, for example, 31 dBm, $M_{PUSCH,D}(i)$ represents the number of resource blocks allocated to D2D data communication, $P_{O\_PUSCH,D}$ represents the first power parameter, $\Delta_{TF}(i)$ represents compensations for different MCSs (modulation and coding scheme), f(i) represents a further adjustment of the transmission power by the TPC under close-loop power control, and $\Delta_{in\_band\_emission}$ represents the second power parameter. Here, $M_{PUSCH,D}(i)$ $\Delta_{TF}(i)$ and f(i) may be defined by referring to existing standard in the art such as the 3GPP TS36.213.

In an embodiment of the present disclosure, the base station device determines the second power parameter based on in-band emission of a resource block to be allocated to the electronic device 200, and performs power control on the electronic device 200, so that power control is performed on the electronic device 200 more accurately, which can be referred to as a fine adjustment of power control of the D2D terminal.

In an embodiment of the present disclosure, the electronic device 200 may receive the information on the second power parameter via a Radio Resource Control RRC signaling or a Physical Downlink Control Channel PDCCH. For example, the receiving unit 220 in the electronic device 200 receives the information on the second power parameter via the Radio Resource Control RRC signaling or the Physical Downlink Control Channel PDCCH such as UL-grant in the PDCCH.

In another embodiment, while the electronic device 200 performs the D2D communication with the target user equipment, the electronic device 200 may further perform cellular communication with the base station device. In this case, the power determining unit 240 may determine the D2D transmission power based on a maximum transmission power of the electronic device 200 and a transmission power of the cellular communication.

In particular, while the electronic device 200 performs the D2D communication with the user equipment, the electronic device 200 further performs cellular communication with the base station device (for example, the eNB as shown in FIG. 1). The power determining unit 240 determines the D2D transmission power based on the maximum transmission power of the electronic device 200 and the transmission power of the cellular communication. Specifically, the power determining unit 240 determines the D2D transmission power based on one of the equations (6) and (7):

$$P_{PUSCH,D}=\min(P_{CMAX,D}(i)-P_{PUSCH,C}(i),10\ \log(M_{PUSCH,D}(i))+P_{0\_PUSCH,D}+\Delta_{TF}(i)+f(i)) \quad (6)$$

$$P_{PUSCH,D}=\min(P_{CMAX,D}(i)-P_{PUSCH,C}(i),10\ \log(M_{PUSCH,D}(i))+P_{0\_PUSCH,D}+\Delta_{TF}(i)+f(i)+\Delta_{in\_band\_emission}) \quad (7)$$

i represents a subframe number, $P_{CMAX,D}(i)$ represents a maximum transmission power of the D2D terminal, for example, 31 dBm $P_{PUSCH,C}(i)$, represents a transmission power on a PUSCH (Physical Uplink Shared Channel) of the cellular communication, $M_{PUSCH,D}(i)$ represents the number of resource blocks allocated to D2D data communication, $P_{O\_PUSCH,D}$ represents the first power parameter, $\Delta_{TF}(i)$ represents compensations for different MCSs (Modulation and Coding Scheme), f(i) represents a further adjustment of the transmission power by the TPC (Transmission Power Control) under close-loop power control, and $\Delta_{in\_band\_emission}$ represents the second power parameter. Here, $M_{PUSCH,D}(i)$, $\Delta_{TF}(i)$ and f(i) may be defined by referring to existing standard in the art such as the 3GPP TS36.213.

In another embodiment, the cellular communication may include at least one of control communication on a Physical Uplink Control Channel PUCCH between the electronic device 200 and the base station device and data communication on a Physical Uplink Data Channel PUSCH between the electronic device 200 and the base station device. Moreover, the power determining unit 240 may determine the D2D transmission power in response to a transmission power of the control communication and/or data communication being performed.

In particular, while the electronic device 200 performs D2D communication with the user equipment, transmission on PUCCH (Physical Uplink Control Channel) is performed, and the power determining unit 260 further determines the D2D transmission power based on a transmission power on the PUCCH. Specifically, the power determining unit 260 determines the D2D transmission power based on one of the following equations (8) and (9):

$$P_{PUSCH,D} = \min(P_{CMAX,D}(i) - P_{PUSCH,C}(i) - P_{PUCCH}(i),$$
$$10 \log(M_{PUSCH,D}(i)) + P_{O\_PUSCH,D} + \Delta_{TF}(i) + f(i)) \quad (8)$$

$$P_{PUSCH,D} = \min(P_{CMAX,D}(i) - P_{PUSCH,C}(i) - P_{PUCCH}(i),$$
$$10 \log(M_{PUSCH,D}(i)) + P_{O\_PUSCH,D} + \Delta_{TF}(i) + f(i) +$$
$$\Delta_{in\_band\_emission}) \quad (9)$$

i represents a subframe number, $P_{CMAX,D}(i)$ represents a maximum transmission power of the D2D terminal, for example, 31 dBm $P_{PUSCH,C}(i)$, represents a transmission power on a PUSCH (Physical Uplink Shared Channel) of the cellular communication, $P_{PUCCH}(i)$ represents a transmission power on the PUCCH, $M_{PUSCH,D}(i)$ represents the number of resource blocks allocated to D2D data communication, $P_{O\_PUSCH,D}$ represents the first power parameter, $\Delta_{TF}(i)$ represents compensations for different MCSs (Modulation and Coding Scheme), f(i) represents a further adjustment of the transmission power by the TPC (Transmission Power Control) under close-loop power control, and $\Delta_{in\_band\_emission}$ represents the second power parameter. Here, $M_{PUSCH,D}(i) \Delta_{TF}(i)$ and f(i) may be defined by referring to existing standard in the art such as the 3GPP TS36.213.

For the D2D transmission power determined in the equation (9), for the resource block allocated to the D2D terminal near to a transmitting position of the PUCCH, the second power parameter $\Delta_{in\_band\_emission}$ should be set to be less than a predetermined threshold, in addition meeting a condition that interference values of all the RBs to be allocated at the same time are similar.

Figure 3:
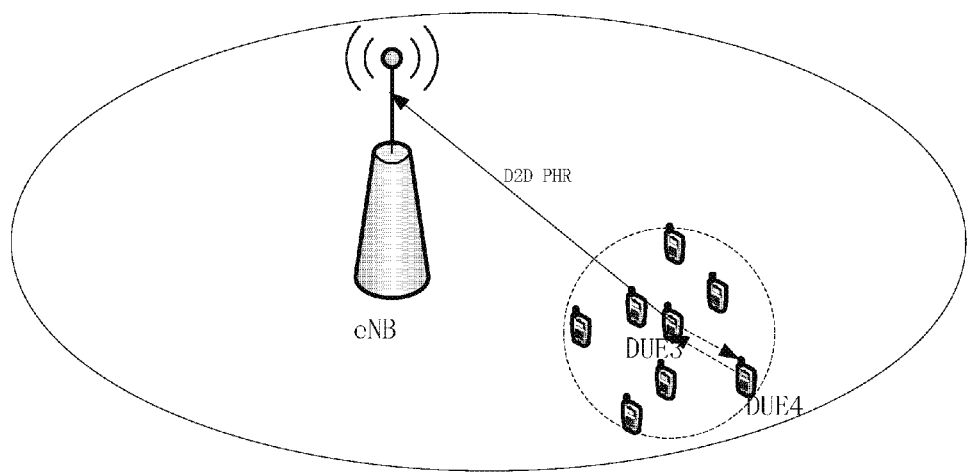
FIG. 3 is a schematic diagram of a scenario in which a D2D terminal reports PHR according to an embodiment of the present disclosure.

FIG. 3 is a schematic diagram of a scenario in which a D2D terminal reports PHR according to an embodiment of the present disclosure. As shown in FIG. 3, DUE3 and DUE4 are two user equipments for performing Device-to-Device D2D communication, and eNB is a serving base station of the DUE3. In a scenario of the D2D unicast communication, communication resources are allocated by the eNB. The scenario as shown in FIG. 3 is merely taken as an example, and the present disclosure is not limited thereto. For example, the eNB may be replaced with a cluster head of a DUE cluster.

In an embodiment of the present disclosure, the DUE3 may include the electronic device 200 as shown in FIG. 2, and the transmitting unit 210 may transmit a D2D signal to the user equipment (for example, the DUE4 as shown in FIG. 3). For example, the electronic device 200 may determine a transmission power for the communication with the user equipment by using the method according to any of the preceding embodiments, and transmit a D2D signal to the user equipment based on the determined D2D transmission power.

In an embodiment of the present disclosure, the electronic device 200 may further include a power headroom reporting unit (not shown in FIG. 3). The power headroom reporting unit may control transmission of Power Headroom Report PHR information to the base station device based on a signal receiving quality parameter about the D2D communication which is fed back by the target user equipment.

In particular, the receiving unit 220 in the electronic device 200 may further receive, from the user equipment, a receiving quality parameter indicating a receiving quality of the D2D channel. The receiving quality parameter may be any parameter indicating the signal quality of the received signal in the art, including but not limited to a Signal to Noise Ratio SNR, a Signal to Interference plus Noise Ratio SINR and the like. Moreover, the transmitting unit 210 in the electronic device 200 may further transmit power headroom PHR information to the base station device (for example, the eNB as shown in FIG. 3) based on the receiving quality parameter.

In an embodiment of the present disclosure, the power headroom reporting unit may control the transmission of the PHR information to the base station device based on whether or not a change in the signal receiving quality parameter exceeds a threshold. For example, the transmitting unit 210 transmits PHR information to the base station device in a case where a change in the receiving quality parameter exceeds the threshold. Subsequently, the base station device performs resource allocation, for example, power control on the electronic device 200 based at least on the PHR information.

In an embodiment of the present disclosure, reporting of the PHR may be extended to a scenario of D2D broadcasting. For example, it may be considered that a coverage area of the D2D broadcasting is changed greatly when a D2D terminal located on an edge of the broadcasting coverage area detects that a change in the received SNR (or SINR) exceeds a threshold, PHR transmission should be triggered at this time. In an embodiment of the present disclosure, a terminal on the edge of the coverage area is taken as criteria for determining whether to trigger PHR. In another embodiment, terminal measurement with a good receiving condition may further be taken as criteria based on an importance of the broadcasting, or the base station specifies some terminals with high priority based on priorities of different terminals.

In an embodiment of the present disclosure, the electronic device 200 may further include a PHR timer, and the transmitting unit 210 further transmits PHR information to the base station device based on the PHR timer. For example, it is triggered to transmit the PHR information to the base station device when a first PHR timer periodicDPHR-Timer is expired; and it is triggered to transmit the PHR information to the base station device when a second PHR timer prohibitDPHR-Timer is expired and a change in the received quality parameter exceeds the threshold.

In another scenario in which a D2D terminal reports PHR, only two user equipments DUE3 and DUE4 for performing device-to-device D2D communication exist, and no base station device eNB exists. Communication resource is allocated by the DUE3 in the scenario of D2D unicast communication.

In an embodiment of the present disclosure, the DUE3 may include the electronic device 200 as shown in FIG. 2, and the transmitting unit 210 may transmit a D2D signal to the user equipment (for example, the DUE4 as shown in FIG. 3). For example, the electronic device 200 may determine a transmission power for the communication with the user equipment by using the method according to any of the preceding embodiments, and transmit a D2D signal to the user equipment based on the determined D2D transmission power.

In an embodiment of the present disclosure, the electronic device 200 may further include a resource allocating unit (not shown in the drawing). The resource allocating unit may acquire Power Headroom Report PHR information from the target user equipment, and determine at least one of a D2D transmission power, a modulation and coding scheme and physical resources for the user equipment based on the PHR information.

In particular, the receiving unit 220 in the electronic device 200 may further receive, from the user equipment, Power Headroom Report PHR information. For example, the user equipment transmits PHR information to the electronic device 200 in a case where a change in the receiving quality parameter of the user equipment exceeds the threshold. The receiving quality parameter may be any parameter indicating the signal quality of the received signal in the art, including but not limited to a Signal to Noise Ratio SNR, a Signal to Interference plus Noise Ratio SINR and the like. Subsequently, the electronic device 200 performs resource allocation, for example, power control on the electronic device based at least on the PHR information.

In an embodiment of the present disclosure, the user equipment may further include a PHR timer, and the user equipment further transmits PHR information to the electronic device 200 based on the PHR timer. For example, it is triggered to transmit the PHR information to the electronic device 200 when a first PHR timer periodicDPHR-Timer is expired; and it is triggered to transmit the PHR information to the electronic device 200 when a second PHR timer prohibitDPHR-Timer is expired and a change in the received quality parameter exceeds the threshold.

In another embodiment, a format of the PHR information is further defined. Type 1 PHR without PUCCH transmission needs to be distinguished from PHR of a cellular network, and hence, it needs to occupy a reserved bit to represent a type of the PHR. For example, 1 represents the PHR of the cellular network communication, and 0 represents PHR of D2D communication. An MAC layer control command for D2D PHR may also be defined. In an embodiment of the present disclosure, an ID having N bits may also be added to identify a PHR to which D2D communication connection corresponds. For the PHR with PDCCH transmission, it needs to define a new type of PHR, for example, Type 3 PHR, the defined format is as follows:

TABLE 1

Format of Type 3 PHR

| C7 | C6 | C5 | C4 | C3 | C2 | C1 | R |
|----|----|----|----|----|----|----|---|
| P  | V  |    | PH(Type 3) | | | | |
| R  | R  |    | $P_{CMAX,D}(i) - P_{PUSCH,C}(i)$ | | | | |
| P  | V  |    | PH(Type 1) | | | | |
| R  | R  |    | $P_{CMAX,D}(i) - P_{PUSCH,C}(i)$ | | | | |
|    |    |    | ID | | | | |
|    |    |    | ID | | | | |

PH (Type 3) represents the PHR with PDCCH transmission, PH(Type 1) represents the PHR without PDCCH transmission, both can represent a type of PHR, for example, 1 represents the PHR of the cellular network communication and 0 represents the PHR of the D2D communication. $P_{CMAX,D}(i)$ represents a maximum transmission power of the D2D terminal, for example, 31 dBm, and $P_{PUSCH,C}(i)$ represents a transmission power on a PUSCH (Physical Uplink Shared Channel) of the cellular communication.

In an embodiment of the present disclosure, a value of PHR is further calculated. For the Type 1 PHR without PUCCH transmission, the value of PHR is calculated based on the following equation:

$$PH_{type1,D}(i) = (P_{CMAX,D}(i) - P_{PUSCH,C}(i)) - (10 \log_{10}(M_{PUSCH,D}(i)) + P_{0\_PUSCH,D} + \Delta_{TF}(i) + f(i) + \Delta_{in\_band\_emission}) \quad (10)$$

$P_{CMAX,D}(i)$ an represents a maximum transmission power of the D2D terminal, for example, 31 dBm, $P_{PUSCH,C}(i)$ represents a transmission power on a PUSCH (Physical Uplink Shared Channel) of the cellular communication, $M_{PUSCH,D}(i)$ represents the number of resource blocks allocated to D2D data communication, $P_{O\_PUSCH,D}$ represents the first power parameter received from the base station device, $\Delta_{TF}(i)$ represents compensations for different MCSs (Modulation and Coding Scheme), f(i) represents a further adjustment of the transmission power by the TPC (Transmission Power Control) under close-loop power control, and $\Delta_{in\_band\_emission}$ represents the second power parameter. Here, $M_{PUSCH,D}(i)$, $\Delta_{TF}(i)$ and f(i) may be defined by referring to existing standard in the art such as the 3GPP TS36.213.

For the Type 3 PHR with PUCCH transmission, a value of PHR is calculated based on the following equation:

$$PH_{type3,D}(i) = (P_{CMAX,D}(i) - P_{PUSCH,C}(i)) - 10\log_{10}$$
$$(10^{(10\log_{10}(M_{PUSCH,D}(i)) + P_{0\_PUSCH,D} + \Delta_{TF}(i) + f(i) + \Delta_{in\_band\_emission})/10} +$$
$$10^{(P_{0\_PUCCH} + PL_c + h(n_{CQI}, n_{HARQ}, n_{SR}) + \Delta_{TXD}(F') + g(i))/10}) \quad (11)$$

$P_{CMAX,D}(i)$ an represents a maximum transmission power of the D2D terminal, for example, 31 dBm $P_{PUSCH,C}(i)$ represents a transmission power on a PUSCH (Physical Uplink Shared Channel) of the cellular communication, $M_{PUSCH,D}(i)$ represents the number of resource blocks allocated to D2D data communication, $P_{O\_PUSCH,D}$ represents the first power parameter received from the base station device, $\Delta_{TF}(i)$ represents compensations for different MCSs (Modulation and Coding Scheme), f(i) represents a further adjustment of the transmission power by the TPC (Transmission Power Control) under close-loop power control, $\Delta_{in\_band\_emission}$ represents the second power parameter received from the base station device; $P_{O\_PUCCH}$ is a parameter including a sum of a parameter $P_{O\_NOMINAL\_PUCCH}$ configured by a high layer and a parameter $P_{O\_UE\_PUCCH}$ configured by a high layer, and $PL_c$ is a downlink path loss estimated value calculated in a UE in a unit of dB, $h(n_{CQI}, n_{HARQ}, n_{SR})$ is a format-related value of the PUCCH, being a function of $n_{CQI}$, $n_{SR}$ and $n_{HARQ}$, with $n_{CQI}$ corresponding to an information bit number of channel quality information CSI. In a case where UE without any relevant transmission block on the uplink shared channel is configured for SR with respect to the subframe i, $n_{SR}=1$, otherwise $n_{SR}=0$. Except that the UE is configured to multiple serving cells, or the UE is configured to one serving cell and used Format 3 of PUCCH, $n_{HARQ}$ represents a bit number of HARQ-ACK transmitted in the subframe i, $\Delta_{F\_PUCCH}(F)$ is defined and provided by the high layer, and a value of respective $\Delta_{F\_PUCCH}(F)$ corresponds to a PUCCH format (F) relative to the PUCCH format 1a. In a case where the high layer configures the user equipment to transmit PUCCH on two antenna ports, a value of $\Delta_{TxD}(F')$ is provided by the high layer, where F' represents a format of PUCCH, $\Delta_{TxD}(F')=0$ in other cases, and g(i) is an adjustment state of power control of current PUCCH. Here, $M_{PUSCH,D}(i)$, $\Delta_{TF}(i)$, f(i), $P_{O\_PUCCH}$, $PL_c$, $h(n_{CQI}, n_{HARQ}, n_{SR})$, $\Delta_{F\_PUCCH}(F)$, $\Delta_{TxD}(F')$ and g (i) are consistent with them defined in the existing standard 3GPP TS36.213 in the art.

Figure 4:
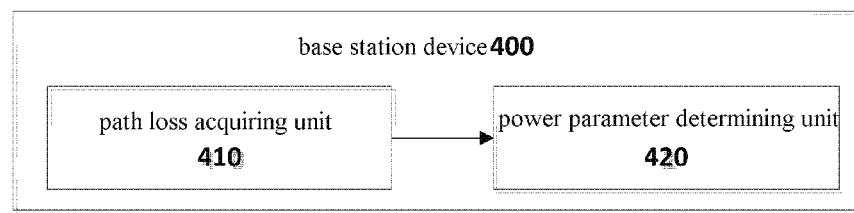
FIG. 4 is a block diagram of a structure of an electronic device on a base station device side according to an embodiment of the present disclosure.

FIG. 4 is a block diagram of a structure of an electronic device 400 on a base station device side according to an embodiment of the present disclosure.

In the embodiment, the electronic device 400 may be an electronic device on a serving base station side (for example, the eNB as shown in FIG. 1) of the user equipment (for example, the DUE1 as shown in FIG. 1) for performing D2D communication. As shown in FIG. 4, the electronic device 400 may include a path loss acquiring unit 410 and a power parameter determining unit 420.

The path loss acquiring unit 410 may acquire a path loss from a first user equipment served by the base station device to a second user equipment served by the base station device.

Furthermore, the power parameter determining unit 420 may determine, for the first user equipment, a D2D transmission power parameter for performing D2D communication with the second user equipment, based on the path loss.

According to an embodiment of the present disclosure, the electronic device 400 may receive data and/or control information from the user equipment (for example, the DUE1 and DUE2 as shown in FIG. 1) to perform cellular communication according to the cellular communication protocol. For example, the cellular communication protocol here may be LTE-A (Long Term Evolution advanced), LTE-U and the like, which is not specially limited in the disclosure. In an embodiment of the present disclosure, the path loss acquiring unit 410 may receive, from the first user equipment, information on the path loss between the first user equipment and the second user equipment. The first user equipment performs device-to-device D2D communication with the second user equipment.

According to an embodiment of the present disclosure, the D2D transmission power parameter may include a first power parameter indicating a nominal power for the first user equipment to perform the D2D communication. Here, the D2D transmission power parameter may not include a power parameter common to respective user equipment served by the base station device.

Specifically, the power parameter determining unit 420 may determine the first power parameter for controlling the first user equipment. In an embodiment of the present disclosure, the power parameter determining unit 420 may determine the first power parameter based on the path loss. The power parameter determining unit 420 may acquire the path loss from the receiving unit (not shown) in the electronic device 400.

The electronic device 400 may transmit data and/or control information to the user equipment (for example, the DUE1 and DUE2 as shown in FIG. 1) to perform cellular communication according to the cellular communication protocol. For example, the cellular communication protocol here may be LTE-A (Long Term Evolution advanced), LTE-U and the like, which is not specially limited in the disclosure. In an embodiment of the present disclosure, the electronic device 400 may transmit information on the first power parameter to the first user equipment. Subsequently, the first user equipment may determine a D2D transmission power for performing D2D communication between the first user equipment and the second user equipment based on the first power parameter.

In another embodiment, the power parameter determining unit 420 may further determine the first power parameter based on interference in a radio environment where the first user equipment is located. In particular, the power parameter determining unit 420 may further determine the first power parameter based on a D2D signal receiving quality demand of the second user equipment and the interference. For example, the power parameter determining unit 420 further determines the first power parameter based on an average interference of a wireless communication network in which the first user equipment and the second user equipment are included. Specifically, the power parameter determining unit 420 determines the first power parameter $P_{O\_PUSCH,D}$ based on the following equation:

$$P_{O\_PUSCH,D} = \frac{T_h \cdot (\sigma^2 + E[I])}{\alpha \cdot PL} \quad (12)$$

$\sigma^2$ represents thermal noise. PL represents the path loss received by the electronic device 400, $\alpha$ is a compensation factor of the path loss, $T_h$ represents a SINR threshold of a receiving terminal (for example, the DUE2 as shown in FIG. 1) of the D2D communication, and E[I] represents an average interference of the wireless communication network in which the first user equipment and the second user equipment are included.

In an embodiment of the present disclosure, the wireless communication network in which the first user equipment and the second user equipment are included is modeled and a distribution of a distance between the user terminals in the network is obtained. Here, the wireless communication network may be modeled based on a well-known modeling method in the art. In an embodiment of the present disclosure, it is assumed that a density of the user terminals in the D2D network is $\lambda$, for a uniform m-dimension Poission Point Process with a density of $\lambda$, a distribution $F_{R_n}(r)$ of a cumulative distribution function cdf of a distance $R_n$ from any user terminal to its n-th neighbor user terminal is:

$$F_{R_n}(r) = 1 - \frac{\Gamma_{ic}(n, \lambda c_m r^m)}{\Gamma(n)} \quad (13)$$

$\Gamma( \ldots )$ represents Gamma Function, $\Gamma_{ic}( \ldots , \ldots )$ represents incomplete Gamma Function, and $c_m r^m$ represents a volume of m-dimension sphere with a radius of r.

The average interference E[I] of the wireless communication network in which the first user equipment and the second user equipment are included is:

$$E[I] = \sum_{n=1}^{\infty} E[R_n^{-\alpha}] \quad (14)$$

$\alpha$ is a compensation factor of the path loss, $\Sigma$ represents a summation formula, and $E[R_n^{-\alpha}]$ represents seeking an expectation for $R_n^{-\alpha}$.

In an embodiment of the present disclosure, in a case where a change in at least one of the path loss and the interference exceeds a threshold, the power parameter determining unit 420 may update the first power parameter. Specifically, in a case where a change in the path loss PL or the average interference E[I] exceeds the threshold, the power parameter determining unit 420 updates the first power parameter $P_{O\_PUSCH,D}$ the electronic device 400 transmits information on the updated first power parameter $P_{O\_PUSCH,D}$ to the first user equipment so that the first user equipment determines the D2D transmission power based on the updated first power parameter $P_{O\_PUSCH,D}$. According to the first power parameter $P_{O\_PUSCH,D}$ calculated according to the embodiment of the present disclosure, only when the number of the user terminals in the network is changed significantly, that is, $\lambda$ is changed, which results in that E[I] is changed, or when the path loss PL between two D2D terminals is changed significantly, the electronic device 400 is triggered to transmit the updated first power parameter $P_{O\_PUSCH,D}$ to the first user equipment. Hence, it is avoided that power control is performed on the first user equipment frequently, and signaling overhead is saved, which can be referred to as a coarse adjustment of D2D terminal power control.

In an embodiment of the present disclosure, the power parameter determining unit 420 further includes, in a Radio Resource Control RRC signaling, information on the first power parameter. The electronic device 400 may further include a transmitting unit (not shown) configured to transmit the RRC signaling to the first user equipment. The transmitting unit in the electronic device 400 may transmit the first power parameter via a downlink signaling. For example, the transmitting unit in the electronic device 400 may transmit the information on the first power parameter via the Radio Resource Control RRC signaling.

In another embodiment, the D2D transmission power parameter further includes a second power parameter, and the power parameter determining unit 420 may further determine the second power parameter based on in-band emission of a resource block to be allocated to the first user equipment, to be used for adjustment of the nominal power.

In a communication process of D2D, in-band emission represents a condition of interference of the allocated RB (resource block) to unallocated RB. Unused RBs are to be allocated to different D2D terminals at the same time, and the base station device may calculate a value of In-band emission on the unallocated RB since the base station learns the allocated RB and the unallocated RB. Here, the value of the In-band emission may be calculated based on the well-known technology in the art, which is not limited herein. Subsequently, the electronic device 400 sets a value of $\Delta_{in\_band\_emission}$ based on the calculated value of the In-band emission so that values of the interference on all the RBs to be allocated at the same time are similar. For example, the values of the interference on all the RBs to be allocated at the same time are in the same order of magnitude or equal.

In an embodiment of the present disclosure, the electronic device 400 determines the second power parameter based on in-band emission of a resource block to be allocated to the first user equipment, and performs power control on the first user equipment, so that power control is performed on the first user equipment more accurately, which can be referred to as a fine adjustment of power control of the D2D terminal.

In an embodiment of the present disclosure, the power parameter determining unit 420 may further include, in a Radio Resource Control RRC signaling or Downlink Control Information DCI, information on the second power parameter. Specifically, the transmitting unit in the electronic device 400 may transmit the second power parameter via a downlink signaling. For example, the transmitting unit in the electronic device 400 may transmit the DCI (i.e., information on the second power parameter) via the Radio Resource Control RRC signaling or a Physical Downlink Control Channel PDCCH such as UL-grant in the PDCCH.

In another embodiment, while the first user equipment performs the D2D communication with the second user equipment, the first user equipment may further perform cellular communication with the electronic device 400. The first user equipment determines the D2D transmission power based on a maximum transmission power of the first user equipment and a transmission power of the cellular communication.

As described above, the first user equipment (for example, the DU3 as shown in FIG. 3) may transmit PHR information to an electronic device (for example, the eNB as shown in FIG. 3) on a base station device side. The eNB may include the electronic device 400 as shown in FIG. 4. The first user equipment may determine a transmission power for the communication with the second user equipment (for example, the DUE4 as shown in FIG. 3) by using the method according to any of the preceding embodiments, and transmit a D2D signal to the second user equipment based on the determined D2D transmission power.

In an embodiment of the present disclosure, the first user equipment is further configured to receive, from the second user equipment, a receiving quality parameter indicating a receiving quality of the D2D channel. The receiving quality parameter may be any parameter indicating the signal quality of the received signal in the art, including but not limited to a Signal to Noise Ratio SNR, a Signal to Interference plus Noise Ratio SINR and the like. Moreover, the receiving unit in the electronic device 400 is further configured to receive, from the first user equipment, power headroom report PHR information. The PHR information is determined by the first user equipment based at least on receiving quality parameter. For example, the first user equipment transmits PHR information to the electronic device 400 in a case where a change in the receiving quality parameter exceeds the threshold. Subsequently, the electronic device 400 performs resource allocation, for example, power control on the first user equipment based at least on the PHR information.

Figure 5:
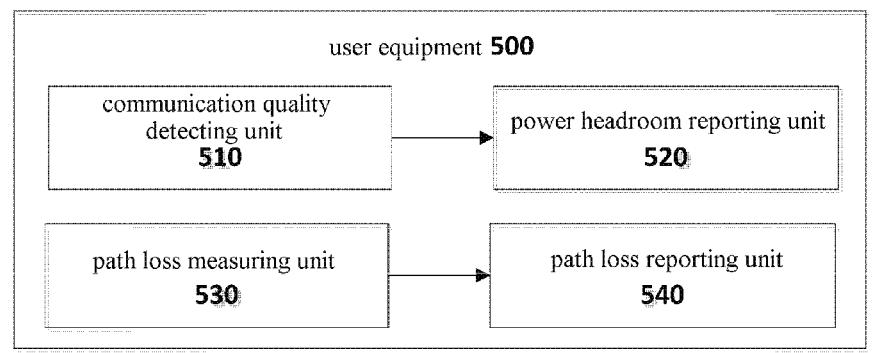
FIG. 5 is a block diagram of a structure of an electronic device on a user equipment side according to another embodiment of the present disclosure.

FIG. 5 is a block diagram of a structure of an electronic device 500 on a user equipment side according to another embodiment of the present disclosure.

In the embodiment, the electronic device 500 may be an electronic device on a user equipment (for example, the DUE1 as shown in FIG. 1) side for performing D2D communication. As shown in FIG. 5, the electronic device 500 may include a communication quality detecting unit 510 and a power headroom reporting unit 520. In addition, the electronic device 500 may include a path loss measuring unit 530 and a path loss reporting unit 540. Similarly, the electronic device 500 may be implemented as a mobile terminal (such as a smart phone, a tablet personal computer (PC), a notebook PC, a portable game terminal, a portable/ dongle mobile router and a digital image pick-up apparatus) or a vehicle terminal (such as a car navigation device). The electronic device 500 may further be implemented as a terminal (also referred to as machine-type communication (MTC) terminal) for performing machine-to-machine (M2M) communication. Alternatively, the electronic device 500 may be a wireless communication module (such as an integrated circuitry module including a single wafer) mounted on each terminal of the above terminals.

According to an embodiment of the present disclosure, the communication quality detecting unit 510 may detect D2D communication quality with a target user equipment. Furthermore, the power headroom reporting unit 520 may determine, based on the D2D communication quality, whether to trigger a power headroom report to a master user equipment. Here, D2D communication of the electronic device 500 is scheduled by the master user equipment.

According to an embodiment of the present disclosure, the master user equipment may be the target user equipment or other user equipment.

According to an embodiment of the present disclosure, the communication quality detecting unit 510 may detect at least one of a Signal to Noise Ratio and a Signal to Interference plus Noise Ratio of a D2D communication signal from the target user equipment to the electronic device 500, so as to obtain the D2D communication quality. Furthermore, the power headroom reporting unit 520 may determine, based on whether a change in the D2D communication quality exceeds a predetermined threshold, whether to trigger the power headroom report to the master user equipment.

According to an embodiment of the present disclosure, the path loss measuring unit 530 may measure a path loss from the target user equipment to the electronic device 500. Furthermore, the path loss reporting unit 540 may include, in a D2D path loss report, information on the path loss and an identifier of the target user equipment, to be reported to the base station device.

Figure 6:
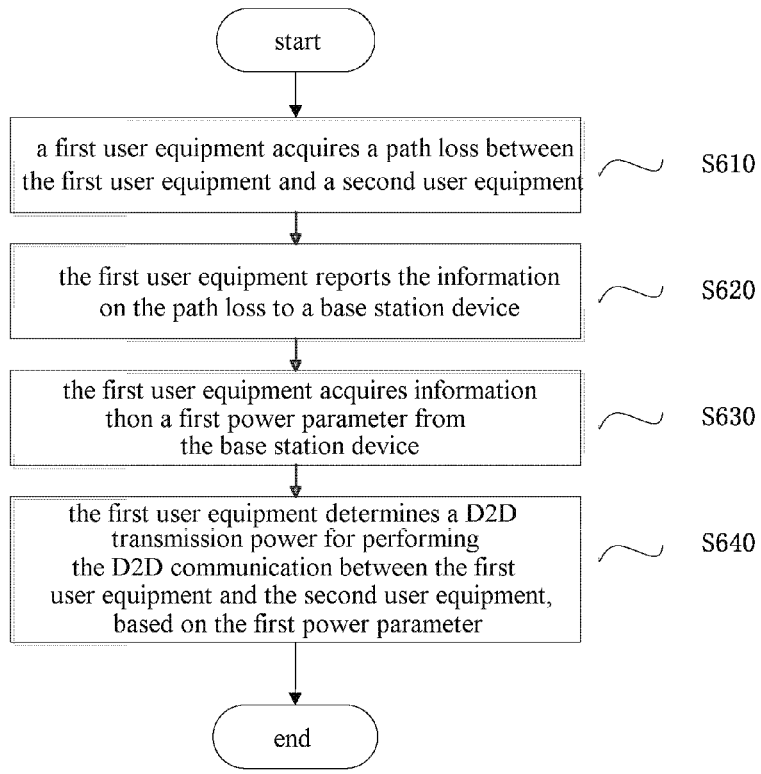
FIG. 6 is a flowchart of a method for performing wireless communication in a wireless communication system according to an embodiment of the present disclosure.

FIG. 6 is a flowchart of a method for performing wireless communication in a wireless communication system according to an embodiment of the present disclosure.

In step S610, a first user equipment acquires a path loss between the first user equipment and a second user equipment, where the first user equipment performs D2D communication with the second user equipment.

Next, in a step S620, the first user equipment reports the information on the path loss to a base station device.

Next, in a step S630, the first user equipment acquires information on a first power parameter from the base station device, where the first power parameter is related to the path loss.

Last, in a step S640, the first user equipment determines a D2D transmission power for performing the D2D communication between the first user equipment and the second user equipment, based on the first power parameter.

Preferably, the method may further include the following steps. The first user equipment transmits a reference signal to the second user equipment. The first user equipment receives, from the second user equipment, a response signal as a response to the reference signal. Here, the first user equipment acquires the path loss between the first user equipment and the second user equipment based on the reference signal and the response signal.

Preferably, the first power parameter may indicate a nominal power for the first user equipment to perform D2D communication, and the first user equipment performs power adjustment based on the nominal power to determine the D2D transmission power.

Preferably, the power adjustment performed by the first user equipment to determine the D2D transmission power may not include adjustment based on the path loss.

Preferably, the first power parameter may further be related to interference in a radio environment where the first user equipment is located.

Preferably, in a case where a change in at least one of the path loss and the interference exceeds a threshold, the first user equipment may acquire information on an updated first power parameter from the base station device, and may determine the D2D transmission power based on the updated first power parameter.

Preferably, the first user equipment may acquire the information on the first power parameter by parsing a dedicated signaling from the base station device.

Preferably, the first user equipment may further acquire information on a second power parameter from the base station device, where the second power parameter indicates a power adjustment value determined based on in-band emission of a resource block to be allocated to the first user equipment, and the first user equipment may further determine the D2D transmission power based on the second power parameter.

Preferably, the first user equipment may receive the information on the second power parameter via a RRC signaling or a PDCCH.

Preferably, while the first user equipment performs the D2D communication with the second user equipment, the first user equipment may further perform cellular communication with the base station device, and the first user equipment may further determine the D2D transmission power based on a maximum transmission power of the first user equipment and transmission power of the cellular communication.

Preferably, the cellular communication may include at least one of control communication on a PUCCH between the first user equipment and the base station device and data communication on a PUSCH between the first user equipment and the base station device, and the first user equipment may further determine the D2D transmission power in response to a transmission power of the control communication and/or data communication being performed.

Preferably, the first user equipment may further control transmission of PHR information to the base station device based on a signal receiving quality parameter about the D2D communication which is fed back by the second user equipment.

Preferably, the first user equipment may control the transmission of the PHR information to the base station device based on whether or not a change in the signal receiving quality parameter exceeds a threshold.

Preferably, the first user equipment may acquire PHR information from the second user equipment, and may determine at least one of a D2D transmission power, a modulation and coding scheme and physical resources for the second user equipment based on the PHR information.

Preferably, the signal receiving quality parameter may include at least one of a SNR and a SINR.

Next, another method for performing wireless communication in a wireless communication system is described. The method includes: acquiring, by the base station device, a path loss from a first user equipment served by the base station device to a second user equipment served by the base station device; and determining, by the base station device, for the first user equipment, a D2D transmission power parameter for performing D2D communication with the second user equipment, based on the path loss.

Preferably, the D2D transmission power parameter may include a first power parameter indicating a nominal power for the first user equipment to perform the D2D communication.

Preferably, the D2D transmission power parameter may not include a power parameter common to respective user equipment served by the base station device.

Preferably, the base station device may further determine the first power parameter based on interference in a radio environment where the first user equipment is located.

Preferably, the base station device may further determine the first power parameter based on a D2D signal receiving quality demand of the user equipment and the interference.

Preferably, in a case where a change in at least one of the path loss and the interference exceeds a threshold, the base station device may further update the first power parameter.

Preferably, the base station device may further include, in the RRC signaling, the information on the first power parameter, and may further transmit the RRC signaling to the first user equipment.

Preferably, the D2D transmission power parameter may further include a second power parameter, and the base station device may further determine the second power parameter based on in-band emission of a resource block to be allocated to the first user equipment, to be used for adjustment of the nominal power.

Preferably, the base station device may further include, in a RRC signaling or DCI, information on the second power parameter, and may transmit the RRC signaling to the first user equipment or transmit the DCI via a PDCCH.

Next, another method for performing wireless communication in a wireless communication system is described, which includes: detecting, by a first user equipment, D2D communication quality with a second user equipment; and determining, by the first user equipment, whether to trigger a power headroom report to a master user equipment, based on the D2D communication quality, where D2D communication of the first user equipment is scheduled by the master user equipment.

Preferably, the master user equipment may be the target user equipment or other user equipments.

Preferably, the first user equipment may detect at least one of a Signal to Noise Ratio and a Signal to Interference plus Noise Ratio of a D2D communication signal from the first user equipment to the second user equipment, so as to obtain the D2D communication quality, and may determine, based on whether a change in the D2D communication quality exceeds a predetermined threshold, whether to trigger the power headroom report to the master user equipment.

Preferably, the first user equipment may measure a path loss from the second user equipment to the first user equipment; and may include, in a D2D path loss report, information on the path loss and an identifier of the second user equipment, to be reported to the base station device.

Various specific embodiments of the above respective steps of a method for performing wireless communication in a wireless communication system according to the embodiment of the present disclosure is described in detail, which are not described repeatedly here.

According to an embodiment of the present disclosure, an electronic device may further be provided, which includes processing circuitry or one or more processors. The processing circuitry or one or more processors are configured to perform the following operations: acquiring a path loss between the electronic device and the target user equipment, the electronic device performing Device-to-Device D2D communication with a target user equipment; reporting information on the path loss to a base station device; acquiring information on a first power parameter from the base station device, the first power parameter being related to the path loss; and determining, based on the first power parameter, a D2D transmission power for performing the D2D communication between the electronic device and the target user equipment.

According to an embodiment of the present disclosure, an electronic device may further be provided, which includes processing circuitry or one or more processors. The processing circuitry or one or more processors are configured to perform the following operations: acquiring a path loss from a first user equipment served by the base station device to a second user equipment served by the base station device; and determining, for the first user equipment, a D2D transmission power parameter for performing Device-to-Device D2D communication with the second user equipment, based on the path loss.

According to an embodiment of the present disclosure, an electronic device may further be provided, which includes processing circuitry or one or more processors. The processing circuitry or one or more processors are configured to perform the following operations: detecting Device-to-Device D2D communication quality with a target user equipment; and determining, based on the D2D communication quality, whether to trigger a power headroom report to a master user equipment, where D2D communication of the electronic device is scheduled by the master user equipment.

It should know that, the electronic device described above may further perform other technical solutions according to the present disclosure as described above, which are not described here any more for brevity.

Apparently, respective operating processes of the method for performing D2D communication in a wireless communication system according to the present disclosure can be implemented in a manner of a computer executable program stored on a machine-readable storage medium.

And, the object of the present disclosure can be implemented in a manner that the storage medium on which the computer executable program above is carried is provided directly or indirectly to a system or apparatus, a computer or a Central Processing Unit (CPU) of which reads out and executes the computer executable program. Here, the implementation of the present disclosure is not limited to a program as long as the system or apparatus has a function to execute the program, and the program can be in arbitrary forms such as an objective program, a program executed by an interpreter, a script program provided to an operating system, etc.

The machine-readable storage medium mentioned above includes, but is not limited to, various memories and storage devices, a semiconductor device, a disk unit such as an optic disk, a magnetic disk and a magneto-optic disk, and other medium suitable for storing information.

Further, the present disclosure can also be implemented by connecting to a corresponding web site on the Internet through a computer, downloading and installing the computer executable program according to the present disclosure into the computer, and then executing the program.

Figure 7:
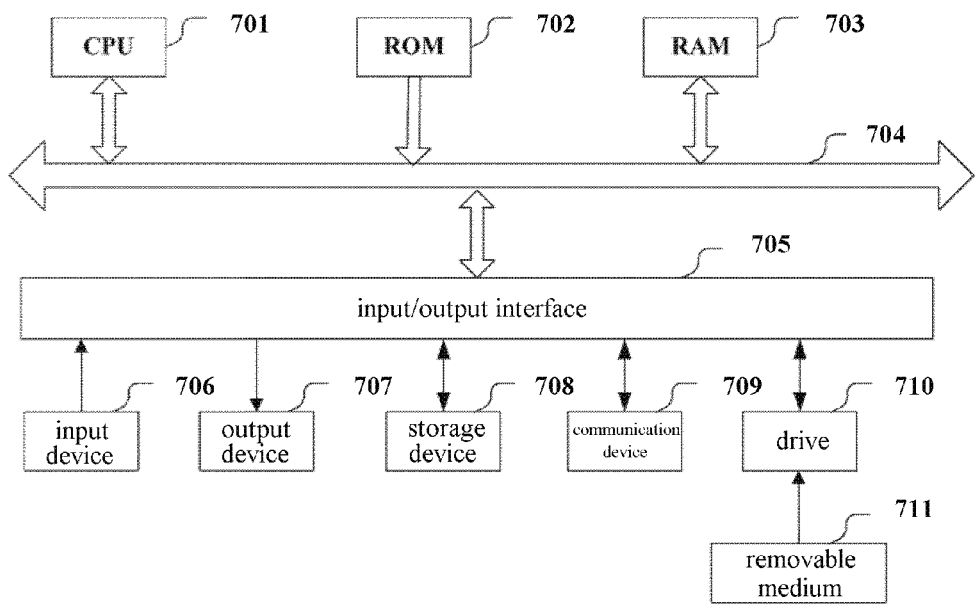
FIG. 7 is a block diagram illustrating an exemplary structure of a general-purpose personal computer in which the method for performing wireless communication in a wireless communication system according to the embodiments of the present disclosure can be implemented.

FIG. 7 is a block diagram illustrating an exemplary structure of a general-purpose personal computer in which the method for performing wireless communication in a wireless communication system according to the embodiments of the present disclosure can be implemented.

As shown in FIG. 7, a CPU 701 executes various processing according to a program stored in a Read Only Memory (ROM) 702 or a program loaded to a Random Access Memory (RAM) 703 from a storage device 708. In the RAM 703, if necessary, data required by the CPU 701 in executing various processing and the like is also stored. The CPU 701, the ROM 702 and the RAM 703 are connected to each other via a bus 704. An input/output interface 705 is also connected to the bus 704.

The following components are connected to the input/output interface 705: an input device 706 including a keyboard, a mouse and the like, an output device 707 including a display such as a Cathode Ray Tube (CRT) and a Liquid Crystal Display (LCD), a speaker and the like, the storage device 708 including a hard disk and the like, and a communication device 709 including a network interface card such as a LAN card, a modem and the like. The communication device 709 performs communication processing via a network such as the Internet. If necessary, a drive 710 may also be connected to the input/output interface 705. A removable medium 711 such as a magnetic disk, an optical disk, a magneto-optical disk, a semiconductor memory and the like is mounted on the drive 710 as necessary such that a computer program read out therefrom is installed in the storage device 708.

If the series of processing above is implemented in software, a program constituting the software is installed from the network such as the Internet or the storage medium such as the removable medium 711.

It is understood by those skilled in the art that the storage medium is not limited to the removable medium 711 shown in FIG. 7 in which the program is stored and which is distributed separately from the device so as to provide the program to the user. Examples of the removable medium 711 include a magnetic disk including a Floppy Disk (registered trademark), an optical disk including a Compact Disk Read Only Memory (CD-ROM) and a Digital Versatile Disc (DVD), a magneto-optical disk including a MiniDisc (MD) (registered trademark), and a semiconductor memory. Alternatively, the storage medium may be the ROM 702, the hard disk contained in the storage device 708 or the like. Herein, the program is stored in the storage medium, and the storage medium is distributed to the user together with the device containing the storage medium.

As described above, the electronic device on the user equipment side and the electronic device on the terminal side in the wireless communication system, and the method for performing wireless communication in the wireless communication system are provided in the present disclosure, a transmission power of a D2D terminal can be calculated based on a path loss between the D2D terminals. Compared with the conventional method for performing power control based on a path loss between a base station device and a terminal device, calculation of the transmission power according to the present disclosure is more accurate. Moreover, effects of interference and in-band emission are further considered in the calculation of the transmission power of the D2D terminal according to the present disclosure, and power control includes two modes of coarse adjustment and fine adjustment. The coarse adjustment can avoid frequent power control and save signaling overhead, and the fine adjustment can make power control more accurate. At last, in the disclosure, it is further specified interaction of D2D power control signaling and reporting of PHR in different resource allocation modes, which PHR reporting process is more applicable to a D2D communication system. In a word, the disclosure can perform power control of the D2D communication more accurately, thereby improving reliability of data transmission of the D2D communication and enhancing a coexistence with a cellular network.

In the system and method of the present disclosure, it is obvious that respective components or steps can be decomposed and/or recombined. Such decomposition and/or recombination should be considered as an equivalent solution of the present disclosure. And, the steps performing a series of processing above can be performed in the describing order naturally, but this is not necessary. Some steps can be performed concurrently or independently with one another.

Although the embodiments of the present disclosure have been described in detail in combination with the drawings above, it should be understood that, the embodiments described above are only used to explain the present disclosure and is not constructed as the limitation to the present disclosure. For those skilled in the art, various modification and alternation can be made to the above embodiments without departing from the essential and scope of the present disclosure. Therefore, the scope of the present disclosure is only defined by the appended claims and the equivalents thereof.

The invention claimed is:

1. A wireless communication system comprising a first user equipment, a second user equipment, and a base station device, the first user equipment performing Device-to-Device (D2D) communication with the second user equipment,
the first user equipment comprising:
first circuitry configured to
acquire D2D transmission power parameters from the base station device, the D2D transmission power parameters comprising a first power parameter that indicates a D2D nominal power for the first user equipment to perform D2D communication, and the D2D nominal power is different from a cellular nominal power for the first user equipment to perform a cellular communication with the base station device, and
transmit D2D signals to the second user equipment with a D2D transmission power determined based on the received D2D transmission power parameters,
and the base station device comprising:
second circuitry configured to
determine the D2D transmission power parameters irrespectively of a path loss between the first user equipment and the second user equipment and based on an in-band emission for the first user equipment performing D2D communication with the second user equipment.

2. The wireless communication system according to claim 1, wherein the first power parameter is further related to interference in a radio environment where the first user equipment is located.

3. The wireless communication system according to claim 2, wherein, when a change in the interference exceeds a threshold, the first circuitry is configured to acquire information on an updated first power parameter from the base station device, and to determine the D2D transmission power based on the updated first power parameter.

4. The wireless communication system according to claim 1, wherein the first circuitry is configured to acquire the first power parameter from radio resource control information from the base station device.

5. The wireless communication system according to claim 1, wherein the in-band emission indicates interference from allocated resource blocks to non-allocated resource blocks, and the second circuitry is configured to estimate the in-band emission and determine the D2D transmission power parameters.

6. The wireless communication system according to claim 1, wherein while the first user equipment performs the D2D communication with the second user equipment, the first circuitry is configured to further perform the cellular communication with the base station device, and the first circuitry is further configured to determine the D2D transmission power based on a maximum transmission power of the first user equipment and transmission power of the cellular communication which is based on the cellular nominal power.

7. The wireless communication system according to claim 6, wherein the cellular communication comprises at least one of control communication on a Physical Uplink Control Channel (PUCCH) between the first user equipment and the base station device and data communication or a Physical Uplink Data Channel (PUSCH) between the first user equipment and the base station device, and the first circuitry is further configured to determine the D2D transmission power in response to a transmission power of the control communication and/or data communication being performed.

8. The wireless communication system according to claim 1, wherein the first circuitry is further configured to control transmission of Power Headroom Report (PHR) information to the base station device based on a signal receiving quality about the D2D communication.

9. The wireless communication system according to claim 8, wherein the first circuitry is configured to control the transmission of the PHR information to the base station device based on whether or not a change in the signal receiving quality exceeds a threshold.

10. A method of performing, with a first user equipment of a wireless communication system that further includes a second user equipment and a base station device, Device-to-Device (D2D) communication with the second user equipment, the method comprising:
at the first user equipment,
acquiring D2D transmission power parameters from the base station device, the D2D transmission power parameters comprising a first power parameter that indicates a D2D nominal power for the user equipment to perform D2D communication, the D2D nominal power being different from a cellular nominal power for the first user equipment to perform cellular communication with the base station device; and
transmitting D2D signals to the second user equipment with a D2D transmission power determined based on the received D2D transmission power parameters; and
at the base station device,
determining the D2D transmission power parameters irrespectively of a path loss between the first user equipment and the second user equipment and based on an in-band emission for the first user equipment performing D2D communication with the second user equipment.

11. The method according to claim 10, wherein the first power parameter is further related to interference in a radio environment where the first user equipment is located.

12. The method according to claim 11, further comprising, at the first user equipment, in response to a change in the interference exceeding a threshold, acquiring information on an updated first power parameter from the base station device, and determining the D2D transmission power based on the updated first power parameter.

13. The method according to claim 10, further comprising, at the first user equipment, acquiring the first power parameter from radio resource control information from the base station device.

14. The method according to claim 10, wherein the in-band emission indicates interference from allocated resource blocks to non-allocated resource blocks, and the base station device estimates the in-band emission and determines the D2D transmission power parameters.

15. The method according to claim 10, wherein, while the first user equipment is performing the D2D communication with the second user equipment, the first user equipment also performs cellular communication with the base station device, and the D2D transmission power is determined based on a maximum transmission power of the first user equipment and transmission power of the cellular communication which is based on the cellular nominal power.

16. The method according to claim 15, wherein the cellular communication comprises at least one of controlling communication on a Physical Uplink Control Channel (PUCCH) between the user equipment and the base station and data communication or a Physical Uplink Data Channel (PUSCH) between the user equipment and the base station, and the method further comprises determining, at the first user equipment, the D2D transmission power in response to a transmission power of the control communication and/or data communication being performed.

17. The method according to claim 10, further comprising, at the first user equipment, controlling transmission of Power Headroom Report (PHR) information to the base station device based on a signal receiving quality about the D2D communication.

18. The method according to claim 17, further comprising controlling the transmission of the PHR information to the base station device based on whether or not a change in the signal receiving quality exceeds a threshold.

* * * * *